(12) United States Patent
Rennie

(10) Patent No.: US 6,409,246 B1
(45) Date of Patent: Jun. 25, 2002

(54) SNAP-IN HINGED VISOR EXTENDER

(75) Inventor: Eric D. Rennie, Spring Lake, MI (US)

(73) Assignee: Johnson Controls Technology Company, Plymouth, MI (US)

(*) Notice: Subject to any disclaimer, the term of this patent is extended or adjusted under 35 U.S.C. 154(b) by 0 days.

(21) Appl. No.: 09/928,551

(22) Filed: Aug. 13, 2001

(51) Int. Cl.$^7$ ................................................. B60J 3/02
(52) U.S. Cl. ..................................... 296/97.6; 296/97.8
(58) Field of Search ............................... 296/97.6, 97.8

(56) References Cited

U.S. PATENT DOCUMENTS

| | | | |
|---|---|---|---|
| 2,517,872 A | | 8/1950 | Hamel |
| 2,596,873 A | * | 5/1952 | Solmes |
| 3,095,233 A | * | 6/1963 | Dryden |
| 4,925,232 A | | 5/1990 | Hemmeke et al. |
| 4,989,910 A | | 2/1991 | Mersman et al. |
| 5,071,186 A | | 12/1991 | Hemmeke et al. |
| D335,482 S | | 5/1993 | Warsaw |
| 5,431,473 A | | 7/1995 | Hiemstra |
| 5,580,117 A | * | 12/1996 | Goclowski ................. 296/97.6 |
| 5,626,381 A | * | 5/1997 | Gervasoni et al. ......... 296/87.9 |
| 5,951,091 A | | 9/1999 | VanderKuyl et al. |
| 6,189,947 B1 | * | 2/2001 | Annan ..................... 296/97.12 |

* cited by examiner

Primary Examiner—Joseph D. Pape
(74) Attorney, Agent, or Firm—Price, Heneveld, Cooper, DeWitt & Litton

(57) ABSTRACT

A visor extender panel includes a mounting bracket which can snap-fit into a visor body and which includes a hinge structure which allows its positioning between a closed position adjacent and overlying an existing visor body and an extended position extending outwardly and in a plane generally parallel to the plane of the visor to which the extender is attached. In a preferred embodiment, the extender panel includes an integral pivot rod and the mounting bracket includes a bias spring coupled on one side of the mounting bracket and having a hook extending through the mounting bracket and engaging the pivot rod on the extender panel for coupling the extender panel to the mounting bracket and allowing rotation of the extender with respect to the mounting bracket, which, in turn, is snap-fitted to an existing visor panel. In an alternative embodiment, the hinge between the mounting bracket and extender panel can be an over-center, integrally molded hinge.

20 Claims, 3 Drawing Sheets

SNAP-IN HINGED VISOR EXTENDER

BACKGROUND OF THE INVENTION

The present invention relates to vehicle visors and particularly to an extender panel attached to a visor with a hinge connection.

Current vehicle designs typically provide relatively large upper windshield areas due to the raked aerodynamic design of the vehicle. As a result, the passenger compartment requires significant sun blocking for the comfort and convenience of a vehicle operator or passenger. Many visors, particularly in relatively compact vehicles, are somewhat small and, as a result, supplemental sun blocking protection is desirable. Several designs have been employed for custom visor systems that provide laterally extendable panels as, for example, shown in U.S. Pat. Nos. 4,989,910, 4,925,232, 5,951,091, 5,431,473, D U.S. Pat. No. 335,482, and U.S. Pat. No. 5,071,186. Such visors provide supplemental sun blocking protection but can be relatively expensive and require significant tooling for the original manufactured visor to accommodate such panels. Also, with the continuously cost-conscious automotive industry where cost and weight constraints for vehicle components is becoming increasingly severe, it would be desirable to provide a sun visor with auxiliary sun-blocking capabilities in an economical system which would allow installation on any visor design without the necessity of requiring specific tooling for visors for each vehicle model.

SUMMARY OF THE INVENTION

The visor of the present invention satisfies this need by providing an extender panel which includes a mounting bracket which can snap-fit into any existing visor panel and which includes a hinge structure which allows its positioning between a closed position adjacent and overlying an existing visor panel and an extended position extending outwardly and in a plane generally parallel to the plane of the visor to which the extender is attached. The mounting bracket includes mounting tabs which lockably attach the extender to the visor and a hinge coupled to an extender panel including bias means for holding the extender in closed, open or intermediate positions.

In the preferred embodiment of the invention, the extender panel includes an integral pivot rod and the mounting bracket includes a bias spring coupled on one side of the mounting bracket and having a hook extending through the mounting bracket and engaging the pivot rod on the extender panel for coupling the extender panel to the mounting bracket and allowing rotation of the extender with respect to the mounting bracket, which, in turn, is snap-fitted to an existing visor panel. The extender panel and mounting bracket interconnection may also include a cam for detenting the extender panel in open, closed or intermediate positions. In an alternative embodiment of the invention, the hinge between the mounting bracket and extender panel can be an over-center, integrally molded hinge to provide the desired control of the extender panel.

These and other features, objects and advantages of the present invention will become apparent upon reading the following description thereof together with reference to the accompanying drawings.

DETAILED DESCRIPTION OF THE PREFERRED EMBODIMENT

Figure 1:
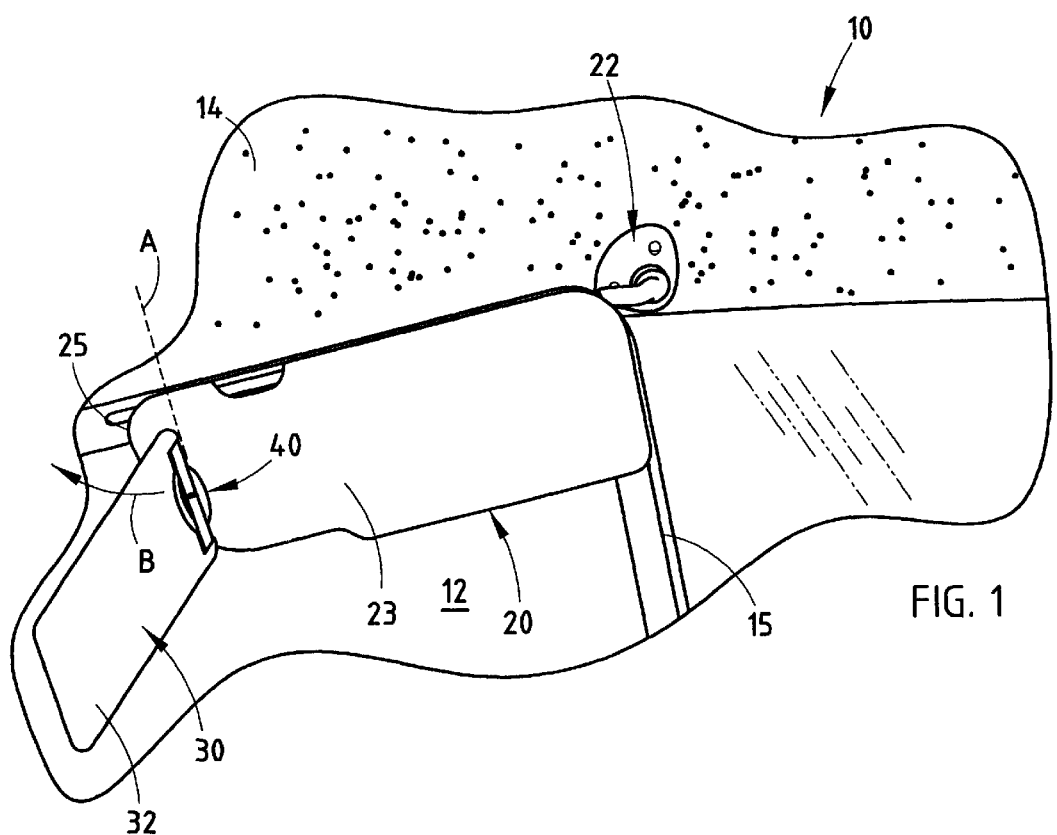
FIG. 1 is a fragmentary perspective view of a vehicle including the visor assembly of the present invention.

Referring initially to FIG. 1, there is shown a vehicle 10, such as an automobile, having a windshield 12, a headliner 14, and an A-pillar support 15. Mounted to the roof structure of the vehicle can be a conventional visor 20 having its own pivot mounting bracket 22 for coupling the visor 20 to the underlying sheet metal support structure for the vehicle roof or, in some embodiments, to the headliner 14 itself. Visor 20 can be of a construction which includes a polymeric core 24 (FIG. 5) made in a clamshell-type construction utilizing a suitable polymeric material, such as polypropylene. Alternatively, the visor core can be fiberboard, rigid foam, or any other suitable core material typically employed for visors in the automotive environment. Mounted to the visor 20 is a visor extender panel assembly 30 of the present invention by means of a mounting bracket 40 which allows the extender panel assembly 30, including bracket 40, to be snap-fitted to the core 24 defining the body 23 of visor 20 in an area adjacent one end 25.

Figure 2:
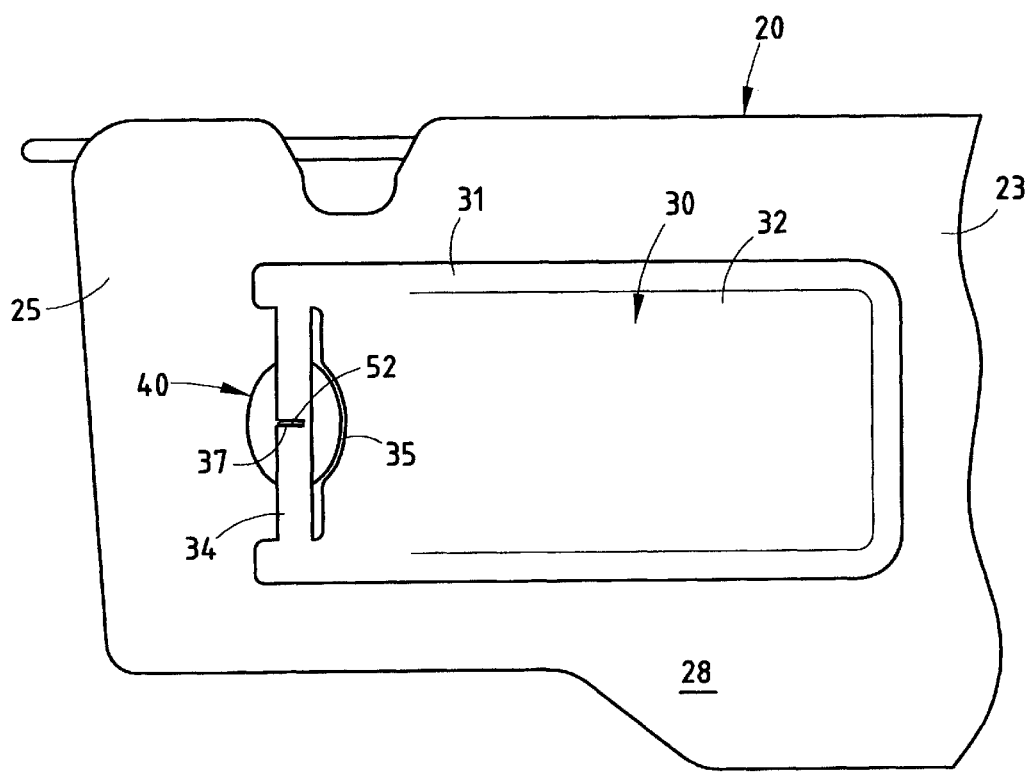
FIG. 2 is an enlarged fragmentary front elevational view of the visor shown in FIG. 1, showing the extender panel in a closed stored position.
Figure 3:
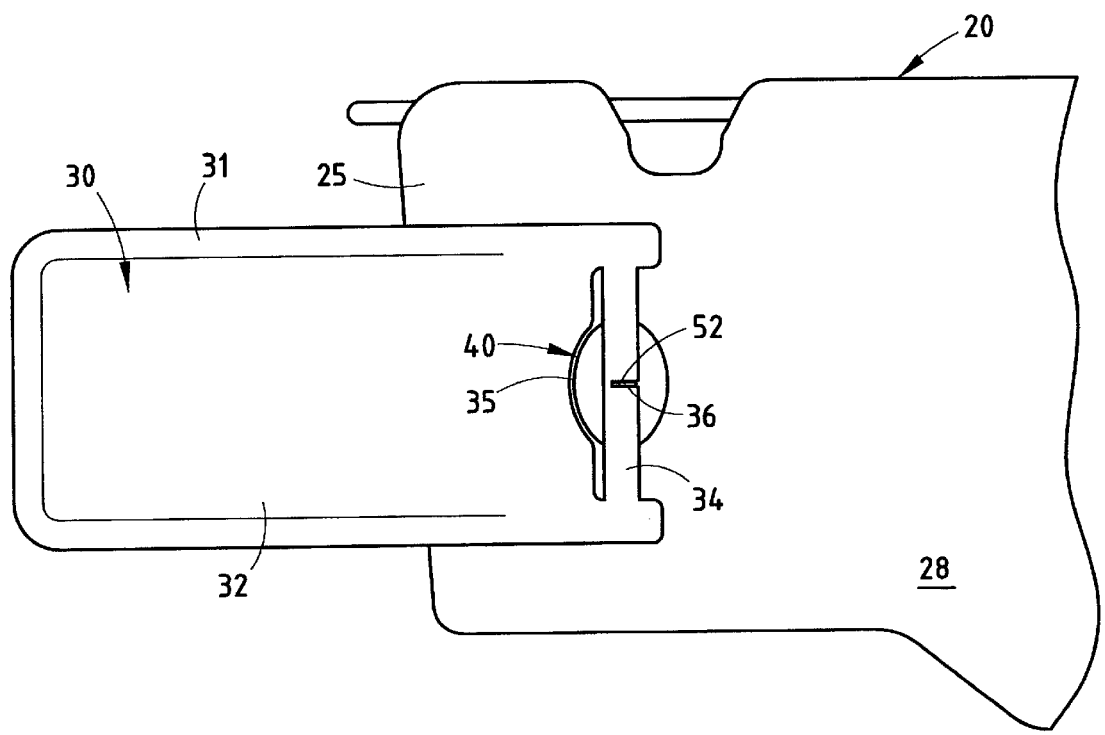
FIG. 3 is an enlarged fragmentary front elevational view of the visor and extender shown in FIG. 1, showing the extender in a fully open position.

Shown in FIG. 1 is a passenger side visor 20 in which the extender assembly 30, defined in part by an extender panel 32, is mounted for pivotal movement about an axis A substantially falling within the plane of the visor body 23 along its minor axis. Extender panel 32 thus is pivoted in a direction indicated by arrow B in FIG. 1 about axis A, which is parallel to the mirror (i.e. vertical) axis of the visor body 23 which has a major generally horizontally extending axis as seen in FIG. 1, between a closed position nesting adjacent the visor body 23, as seen in FIG. 2, to a fully extended position in which it extends substantially parallel to the visor body 23 and outwardly from end 25, as shown in FIG. 3. Visor body 23 may include a recessed area allowing the nesting of the extender panel 32, however, it is preferable that extender assembly 30 be mounted to any visor 20 without modification.

Figure 4:
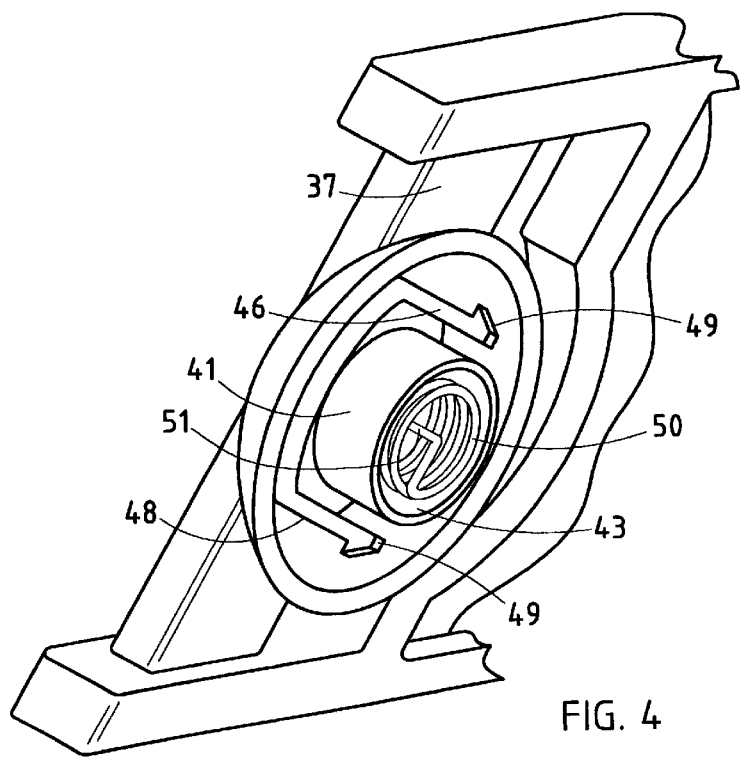
FIG. 4 is a fragmentary rear perspective view of the mounting bracket for the extender panel which is shown removed from the visor.
Figure 6:
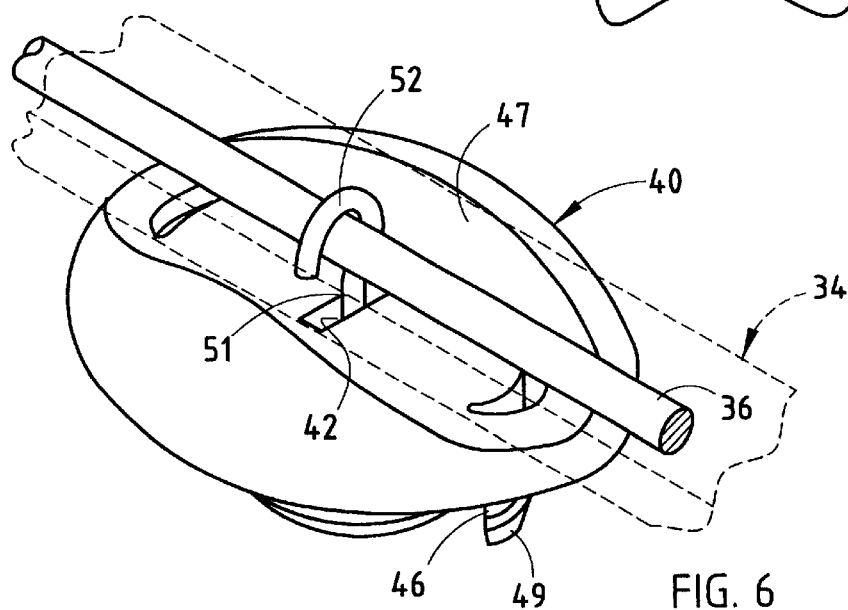
FIG. 6 is a fragmentary perspective view showing the interconnection of the extender mounting bracket to a pivot rod in the extender panel.

As best seen in FIGS. 2 and 3, the visor extender assembly 30 comprises a visor panel 32, which can be a solid integrally molded polymeric material, such as polyvinyl chloride, polypropylene, polycarbonate, or the like, suitable for the automotive environment and can be a relatively thin panel having a peripheral reinforcing ridge 31 extending therearound. At one end of the panel 32, there is provided an arm 34 defined, in part, by a notch 35. Arm 34 includes an embedded steel pivot rod 36 (FIG. 6), which is insert-molded within the arm and which receives a hook 52 of a coiled tension spring 50 (FIG. 4) extending through the mounting bracket 40 and into engagement with the insert-molded pivot rod 36. Arm 34 can have a cylindrical cross section which nests within the semicylindrical receiving surface 47 of mounting bracket 40, as seen in FIG. 6. Arm 34 also includes a laterally extending slot 37 to accommodate the hook 52 of spring 50. Mounting bracket 40 includes a central slot 42 (FIG. 6) through which the hooked end 52 of spring 50 extends, as best seen in FIG. 6. The pivot rod 36 and hook 52 define a pivot hinge connection between the mounting bracket 40 and visor extender panel 32.

Figure 5:
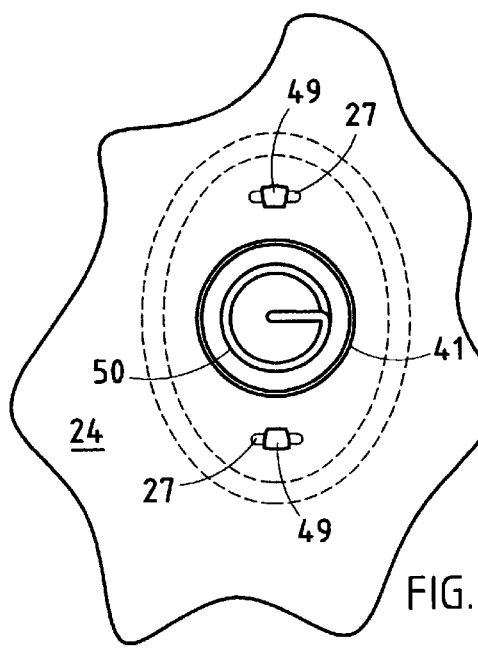
FIG. 5 is an enlarged fragmentary plan view of the back of the visor, partly broken away, showing the mounting of the extender panel bracket to the visor body.

Mounting bracket 40 includes a central body 41 (FIG. 4) with a cylindrical recess 43 for receiving the coil tension spring 50 with a leg 51 extending axially through the center of coiled spring 50 and terminating in hook 52, which extends through aperture 42 in mounting bracket 40. Mounting bracket 40 further includes a pair of downwardly extending mounting tabs 46 and 48, each of which include outwardly projecting tangs 49 for snap-locking the mounting bracket in slots 27 of the core 25 of the main visor 20, as best seen in FIG. 5. Arm 34 includes a sufficient clearance aperture 37 adjacent notch 36 to allow the spring hook 52 to be extended through the arm 34, expanding the spring and allowing hook 52 to extend over rod 36 and subsequently releasing the spring to compressibly hold arm 34 within the cylindrical socket 47 of mounting bracket 40.

With the mounting bracket and panel so hingedly coupled, the extender panel assembly 30 can then be mounted to an existing visor body, which can include a universal core design including aligned slots 27 near end 25 to allow the mounting bracket 40 to be pushed through the upholstery fabric 28 of visor 20 until the flanges 49 of tabs 46 and 48 snap-lock the mounting bracket to the visor body. Once assembled, the panel 30 can be moved from the stored position, shown in FIG. 2, to a partially extended position, shown in FIG. 1, or fully extended position, shown in FIG. 3, to provide supplemental sun blocking for the visor 20. As can be appreciated, the visor extender panel can be mounted to either end of the visor 20 and, if sufficiently short, a pair of extenders can be mounted to each end, allowing the visor to be extended in both directions.

Figure 7:
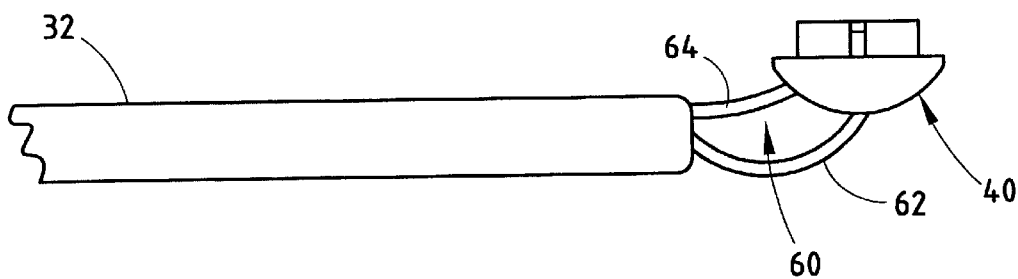
FIG. 7 is a top plan view of an alternative embodiment of the hinge coupling the visor extender panel to its mounting bracket.

In place of the coiled spring pivot rod hinge design of the preferred embodiment of the invention as seen in the plan view of FIG. 7, an integrally molded over-center hinge assembly 60 can be employed for coupling the extender panel 32 to the mounting bracket 40, which over-center hinge 60, bracket 40, and extender panel 32 can be integrally molded of a suitable polymeric material. Hinge 60 can be a conventional over-center hinge construction including a center arm 62 and a pair of spaced-apart outer arms 64 spanning center arm 62 to hold the extender panel 32 in either a fully extended or a closed position.

It will become apparent to those skilled in the art that various modifications to the preferred embodiment of the invention as described herein can be made without departing from the spirit or scope of the invention as defined by the appended claims.

The invention claimed is:

1. A visor extender panel assembly for a vehicle visor, said assembly comprising:
   an extender panel;
   a mounting bracket for attaching said extender panel to a visor body; and
   a hinge coupling said extender panel to said mounting bracket for allowing the rotation of said extender panel with respect to the mounting bracket, such that when said mounting bracket is attached to a visor panel, said extender panel can be moved between a closed position in which the extender panel is adjacent a visor body and an extended position in which said extender panel extends outwardly from the visor body, wherein said hinge comprises a spring extending from said mounting bracket and including a hook, and said extender panel includes a pivot rod over which said hook extends for coupling the extender panel to said mounting bracket and allowing rotation of said extender panel with respect to said mounting bracket.

2. The panel assembly as defined in claim 1 wherein said mounting bracket includes a semicylindrical socket for receiving said pivot rod of said extender panel.

3. The panel assembly as defined in claim 2 wherein the extender panel includes an arm including the pivot rod mounted therein and wherein the arm is nestably received by said socket of said mounting bracket.

4. The panel assembly as defined in claim 1 wherein said mounting bracket and extender panel are molded of a polymeric material.

5. The panel assembly as defined in claim 4 wherein said hinge comprises an over-center hinge integrally molded with said mounting bracket and said extender panel.

6. A visor having an extender panel comprising:
   a visor body having major and minor axes and including a bracket for attachment of said visor body to a vehicle;
   an extender panel;
   a mounting bracket for attaching said extender panel to said visor body, said mounting bracket including at least one mounting tab for inserting into said visor body for lockably attaching said mounting bracket to said visor body; and
   a hinge coupling said extender panel to said mounting bracket for allowing the rotation of said extender panel with respect to the mounting bracket, such that said extender panel can be moved between a closed position in which the extender panel is adjacent said visor body and an extended position in which said extender panel extends outwardly from said visor body, wherein said hinge comprises a spring extending from said mounting bracket and including a hook, and said extender panel includes a pivot rod over which said hook extends for coupling the extender panel to said mounting bracket and allowing rotation of said extender panel with respect to said mounting bracket.

7. The visor as defined in claim 6 wherein said mounting bracket includes a semicylindrical socket for receiving said pivot rod of said extender panel.

8. The visor as defined in claim 7 wherein the extender panel includes an arm and said pivot rod is mounted in said arm and wherein the arm is nestably received by said socket of said mounting bracket.

9. The visor as defined in claim 6 wherein said mounting bracket and extender panel are molded of a polymeric material.

10. The visor as defined in claim 9 wherein said hinge comprises an over-center hinge integrally molded of a polymeric material with said mounting bracket and said extender panel.

11. A vehicle visor extender panel assembly comprising:
   a generally elongated planar polymeric extender panel including an arm extending near one end;
   a mounting bracket for attaching said extender panel to a visor body; and
   a hinge coupling said arm of said extender panel to said mounting bracket for allowing the rotation of said extender panel with respect to the mounting bracket, such that when said mounting bracket is attached to a visor panel, said extender panel can be moved between a closed position in which the extender panel is adjacent a visor body and an extended position in which said extender panel extends outwardly from the visor body, wherein said hinge comprises a spring extending from said mounting bracket and including a hook, and said arm of said extender panel includes a pivot rod over which said hook extends for coupling the extender panel to said mounting bracket and allowing rotation of said extender panel with respect to said mounting bracket.

12. The panel assembly as defined in claim 11 wherein said mounting bracket includes a semicylindrical socket for receiving said arm of said extender panel.

13. The panel assembly as defined in claim 12 wherein said mounting bracket includes at least one mounting tab for inserting into a visor body for lockably attaching said mounting bracket to a visor body.

14. The panel assembly as defined in claim 11 wherein said mounting bracket and extender panel are molded of a polymeric material.

15. The panel assembly as defined in claim 14 wherein said hinge structure comprises an over-center hinge integrally molded with said mounting bracket and said extender panel.

16. A visor comprising:

a visor body;

an extender panel;

a mounting bracket for snap-fitting said extender panel to said visor body, said mounting bracket including a pair of spaced-apart mounting tabs for inserting into slots formed in said visor body to lockably attach said mounting bracket to said visor body; and a hinge coupling said extender panel to said mounting bracket for allowing the rotation of said extender panel with respect to the mounting bracket, such that when said mounting bracket is attached to said visor body, said extender panel can be moved between a closed position in which the extender panel is adjacent said visor body and an extended position in which said extender panel extends outwardly from said visor body, wherein said hinge comprises a spring extending from said mounting bracket and including a hook, and said extender panel includes a pivot rod over which said hook extends for coupling the extender panel to said mounting bracket and allowing rotation of said extender panel with respect to said mounting bracket.

17. The visor as defined in claim 16 wherein said mounting bracket includes a semicylindrical socket for receiving said pivot rod of said extender panel.

18. The visor as defined in claim 17 wherein the extender panel includes an arm and said pivot rod is mounted in said arm and wherein the arm is nestably received by said socket of said mounting bracket.

19. The visor as defined in claim 16 wherein said mounting bracket and extender panel are molded of a polymeric material.

20. The visor as defined in claim 19 wherein said hinge comprises an over-center hinge integrally molded of a polymeric material with said mounting bracket and said extender panel.

* * * * *